US012200626B2

(12) United States Patent
He et al.

(10) Patent No.: US 12,200,626 B2
(45) Date of Patent: Jan. 14, 2025

(54) METHODS AND APPARATUS FOR POWER CONTROL MECHANISMS FOR SIMULTANEOUS UPLINK TRANSMISSIONS ON MULTIPLE PANELS IN WIRELESS COMMUNICATION

(71) Applicant: Apple Inc., Cupertino, CA (US)

(72) Inventors: Hong He, San Jose, CA (US); Chunxuan Ye, San Diego, CA (US); Dawei Zhang, Saratoga, CA (US); Haitong Sun, Cupertino, CA (US); Huaning Niu, San Jose, CA (US); Jie Cui, San Jose, CA (US); Oghenekome Oteri, San Diego, CA (US); Seyed Ali Akbar Fakoorian, San Diego, CA (US); Sigen Ye, San Diego, CA (US); Wei Zeng, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 328 days.

(21) Appl. No.: 17/661,279

(22) Filed: Apr. 28, 2022

(65) Prior Publication Data

US 2023/0354204 A1    Nov. 2, 2023

(51) Int. Cl.
*H04W 52/36* (2009.01)
*H04W 52/14* (2009.01)
*H04W 76/20* (2018.01)

(52) U.S. Cl.
CPC ....... *H04W 52/146* (2013.01); *H04W 52/367* (2013.01); *H04W 76/20* (2018.02)

(58) Field of Classification Search
CPC ..... H04W 52/00; H04W 52/04; H04W 52/06; H04W 52/14; H04W 52/146; H04W 52/18; H04W 52/22; H04W 52/36; H04W 52/367; H04W 76/20
See application file for complete search history.

(56) References Cited

U.S. PATENT DOCUMENTS

| | | | |
|---|---|---|---|
| 6,879,572 B1* | 4/2005 | Ayyagari | H04W 52/343 370/335 |
| 2014/0219203 A1* | 8/2014 | Lin | H04W 52/34 370/329 |
| 2016/0112966 A1* | 4/2016 | Jung | H04W 52/34 370/311 |
| 2017/0223635 A1* | 8/2017 | Dinan | H04W 52/367 |
| 2018/0014254 A1* | 1/2018 | Hwang | H04W 72/0473 |
| 2018/0206196 A1* | 7/2018 | Wang | H04W 52/343 |

(Continued)

FOREIGN PATENT DOCUMENTS

JP    2019193226 A    * 10/2019

*Primary Examiner* — Matthew W Genack
(74) *Attorney, Agent, or Firm* — DICKINSON WRIGHT RLLP

(57) ABSTRACT

Embodiments of the present disclosure relate to uplink multi-panel transmission. According to embodiments of the present disclosure, a processor of a user equipment (UE) is configured to determine whether a total transmission power of a plurality of uplink transmissions to be performed on a plurality of panels of the UE exceeds a maximum transmission power of the UE, each of the plurality of uplink transmissions being associated with a respective one of the plurality of panels and the plurality of uplink transmissions overlapping in a time domain. The operations further comprise performing power control for the uplink multi-panel transmission.

29 Claims, 11 Drawing Sheets

(56) References Cited

U.S. PATENT DOCUMENTS

2018/0324716 A1* 11/2018 Jeon ................. H04W 74/0833
2019/0098658 A1*  3/2019 Noh ................. H04W 72/0453
2019/0215783 A1*  7/2019 Chakraborty ....... H04W 52/146
2021/0168714 A1*  6/2021 Guan .................. H04W 52/16

* cited by examiner

METHODS AND APPARATUS FOR POWER CONTROL MECHANISMS FOR SIMULTANEOUS UPLINK TRANSMISSIONS ON MULTIPLE PANELS IN WIRELESS COMMUNICATION

TECHNICAL FIELD

Embodiments of the present disclosure generally relate to the field of telecommunications, and in particular, to power control mechanisms for simultaneous uplink transmissions on multiple panels (STxMP) in wireless communication.

BACKGROUND

For the fifth generation (5G) system operating above 6 GHz, a user equipment (UE) may comprise multiple antenna panels (also referred to as "panels") and maintain a plurality of spatial domain transmission filters. Then, the UE is able to transmit uplink signals from the multiple antenna panels.

SUMMARY

In general, example embodiments of the present disclosure provide a solution for power control mechanisms on multiple panels.

In a first aspect, there is provided a processor of a user equipment. The processor is configured to determine whether a total transmission power of a plurality of overlapped uplink transmissions to be performed on a plurality of panels of the UE exceeds a maximum transmission power of the UE, each of the plurality of overlapped uplink transmissions being associated with a respective one of the plurality of panels; in accordance with a determination that the total transmission power exceeds the maximum transmission power, determine at least one target uplink transmission from the plurality of overlapped uplink transmission; and reduce a transmission power of the at least one target uplink transmission to be performed on the at least one panel.

In a second aspect, there is provided a processor of a user equipment. The processor is configured to determine a minimum uplink transmission power for each panel of a plurality of panels of the UE; determine whether a total uplink transmission power of a plurality of uplink transmissions to be performed on a plurality of panels of the UE exceeds a maximum transmission power of the UE, each of the plurality of overlapped uplink transmissions being associated with a respective one of the plurality of panels and the plurality of uplink transmissions overlapping in a time domain; in accordance with a determination that the total transmission power exceeds the maximum transmission power, reduce uplink transmission powers of the plurality of uplink transmissions to be performed on the plurality of panels while maintaining the transmission power for each panel of the plurality of panels above the respective minimum uplink transmission power.

In a third aspect, there is provided a processor of a user equipment. The processor is configured to determine a maximum uplink transmission power of a first panel of the UE; determine whether a total uplink transmission power of the first panel of the UE exceeds the maximum uplink transmission power of the first panel; and in accordance with a determination that the total uplink transmission power exceeds the maximum uplink transmission power, reduce the total uplink transmission power of the first panel.

In a fourth aspect, there is provided a user equipment according to any of the above first, second, third aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
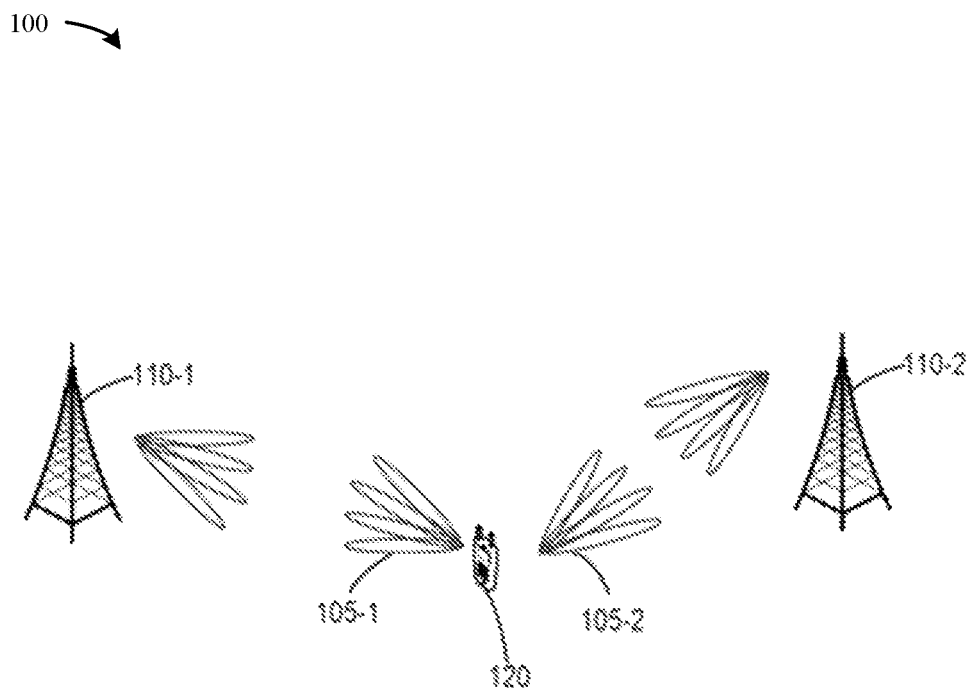
FIG. 1 shows an example communication network in which example embodiments of the present disclosure can be implemented.

Principle of the present disclosure will now be described with reference to some embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

The terminology used herein is for the purpose of describing particular embodiments only and is not intended to be limiting of example embodiments. For example, as used herein, the singular forms "a", "an" and "the" are intended to include the plural forms as well, unless the context clearly indicates otherwise. The terms "comprises", "comprising", "has", "having", "includes" and/or "including", when used herein, specify the presence of stated features, elements, and/or components etc., but do not preclude the presence or addition of one or more other features, elements, components and/or combinations thereof. Moreover, when a particular feature, structure, or characteristic is described in connection with some embodiments, it is submitted that it is within the knowledge of one skilled in the art to affect such feature, structure, or characteristic in connection with other embodiments whether or not explicitly described.

It is also to be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As mentioned above, for the fifth generation (5G) system operating above 6 GHz, a user equipment (UE) may comprise multiple antenna panels (also referred to as "panels") and maintain a plurality of spatial domain transmission filters. Then, the UE is able to transmit uplink signals from the multiple antenna panels.

There are two STxMP modes supported by UE according to UE capability, as following:

Mode-1: Synchronous UL Simultaneous Transmission across Multi-Panel (STxMP). The relative receive timing difference between the slot timing of the signals received from a first panel and second panel does not exceed Cyclic Prefix (CP) length.

Mode-2: Asynchronous STxMP. The relative receive timing difference between the slot timing of the signals received from a first panel and second panel may exceed Cyclic Prefix (CP) length and up to a half slot duration.

Embodiments of the present disclosure propose a solution for power control mechanisms on multiple panels. In this solution, a variety of power control solutions were proposed to enable UL Simultaneous Multi-Panel (STxMP) transmission. And the present solution may be suitable for both STxMP mode-1 and/or STxMP mode-2. As used herein, simultaneous transmissions may include, but are not limited to, transmissions which occur that the same time and/or transmissions which occur in a substantially contemporaneous manner.

According to embodiments of the present disclosure, the tradeoff between UE complexity and scheduling flexibility at the network side is considered.

Principle and implementations of the present disclosure will be described in detail below with reference to FIGS. 1-6. FIG. 1 shows an example communication network 100 in which embodiments of the present disclosure can be implemented. The network 100 includes two base stations (BSs) 110-1 and 110-2, which may be collectively referred to as "BSs 110" or individually referred to as a "BS 110", and a UE 120 served by the BSs 110 of the network 100. The UE 120 may have a plurality of panels for transmission. For example, FIG. 1 shows a panel 105-1 and a panel 105-2, which may be collectively referred to as "panels 105" or individually referred to as a "panel 105".

It is to be understood that the numbers of BSs 110, UEs 120 and panels 105 as shown in FIG. 1 are only for the purpose of illustration without suggesting any limitations. The network 100 may include any suitable number of BSs, UEs and panels adapted for implementing embodiments of the present disclosure.

In the communication network 100, the BS 110 can communicate data and control information to the UE 120 and the UE 120 can also communication data and control information to the BS 110. A link from the BS 110 to the UE 120 is referred to as a downlink (DL) or a forward link, while a link from the UE 120 to the BS 110 is referred to as an uplink (UL) or a reverse link. For uplink multi-panel transmission, the UE 120 may transmit data and control information from different panels to a corresponding BS 110, for example, a corresponding gNodeB (gNB).

Figure 2:
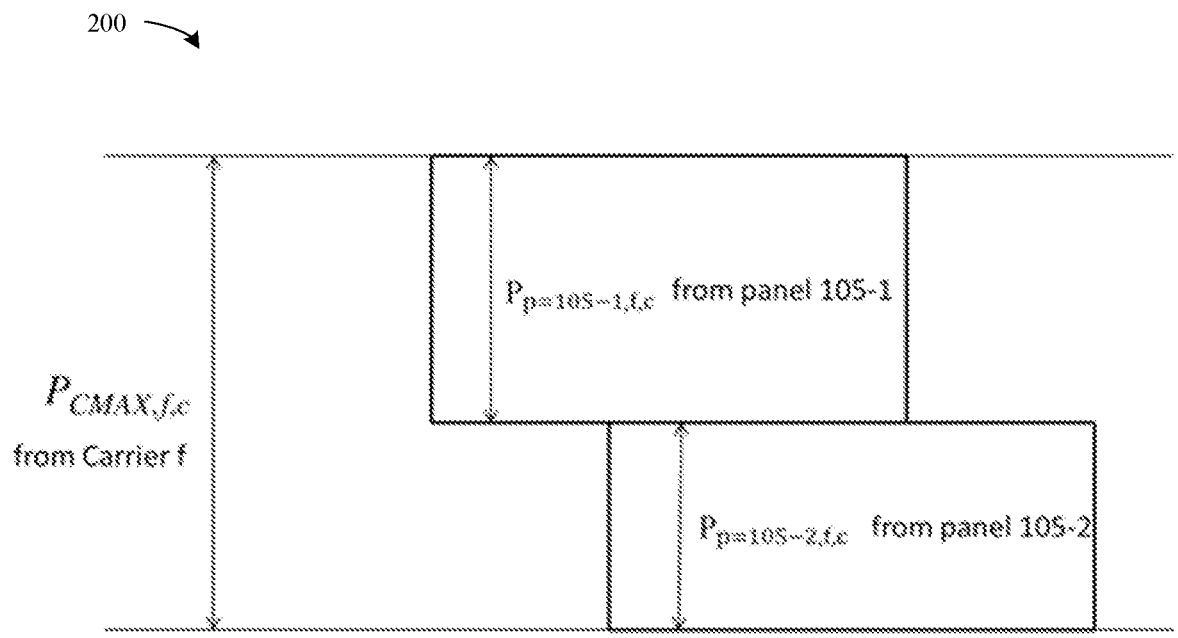
FIG. 2 illustrates a schematic diagram 200 of transmission power on different panels according to some embodiments of the present disclosure.

Reference is now made to FIG. 2. FIG. 2 illustrates a schematic diagram 200 of transmission power on different panels according to some embodiments of the present disclosure. For the purpose of discussion, the diagram 200 will be described with reference to FIG. 1. The diagram 200 may involve the UE 120 and the panel 105-1, panel 105-2 shown in FIG. 1. As shown in FIG. 2, there are 2 panels on carrier f, which are panel 105-1 and panel 105-2 and the uplink transmission power on panel 105-1 is $P_{p=105-1,f,c}$, the uplink transmission on panel 105-2 is $P_{p=105-2,f,c}$. The $P_{p=105-1,f,c}$ and $P_{p=105-2,f,c}$ may be calculated by UE based on the scheduling Download Control Information (DCI) format and Opening Loop Power Control (OLPC) parameters. The total uplink transmission of panel 105-1 and panel 105-2 should not exceed the max uplink transmission power of carrier f, that is $P_{cmax,f,c}$.

Dynamic Uplink Transmission Power Sharing

A first solution for power control for multi-panel transmission is to share the uplink transmission between the panels of UE 120 dynamically and ensure that the total transmission power of overlapped uplink transmissions is lower than the maximum transmission power of the UE 120. In the first solution, power control is performed across the plurality panels 105 of the UE 120.

In this solution, the UE 120 performs power control for at least one of the overlapped uplink transmissions from the plurality of panels 105 if a total transmission power of the UE 120 is above a maximum transmission power of the UE 120. In other words, the UE 120 determines whether a total transmission power of the plurality of uplink transmissions to be performed by the UE 120 exceeds the maximum transmission power of the UE 120. The plurality of uplink transmissions are overlapped in time.

The UE 120 further reduces the transmission power of a target uplink transmission to be performed from at least one of the plurality of panels 105 to reduce the total transmission power if the total transmission power exceeds the maximum transmission power. The UE 120 further causes the plurality of uplink transmissions to be performed by the UE 120 with the reduced total transmission power.

In this way, the UE 120 may ensure that the total transmission power of overlapped uplink transmissions is lower than the maximum transmission power of the UE 120.

Figure 3:
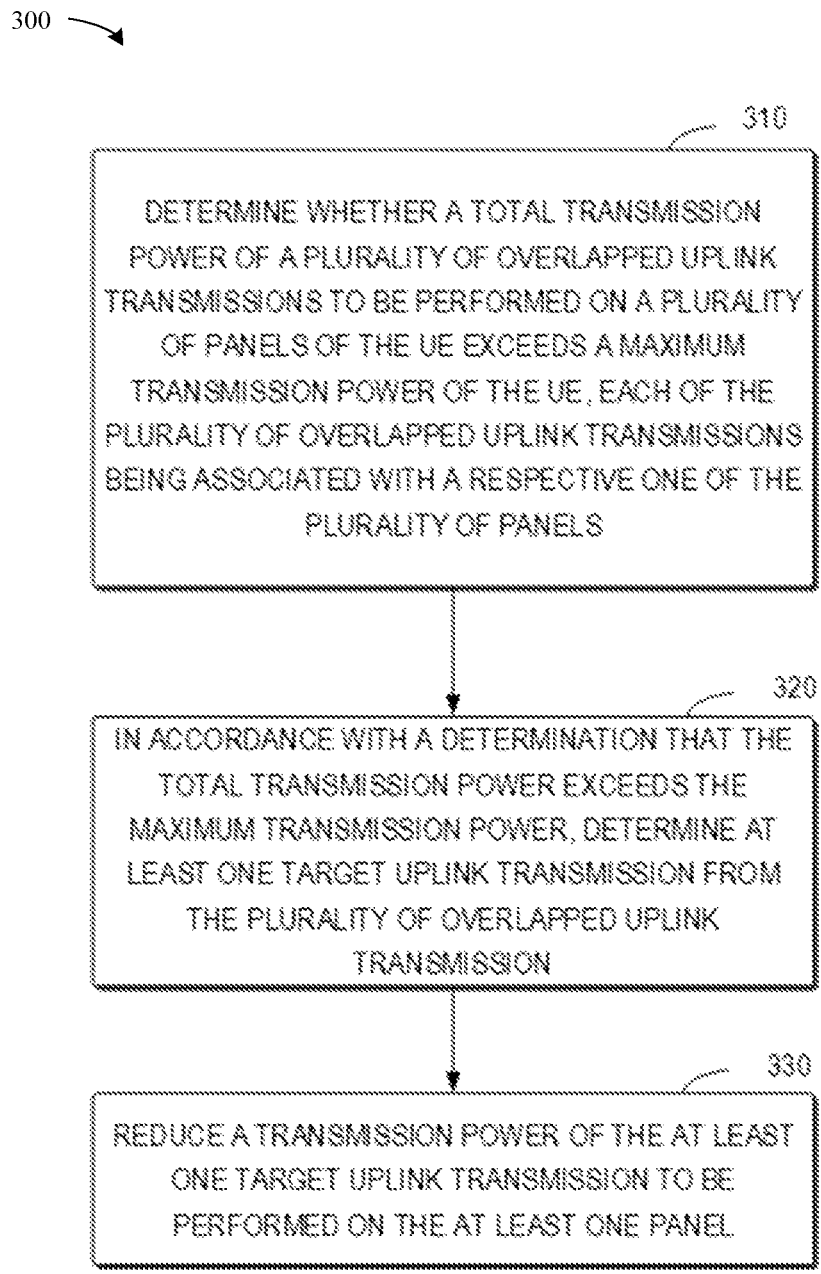
FIG. 3 illustrates a flowchart of an example method 300 for dynamic uplink transmission power sharing according to some embodiments of the present disclosure.

Reference is now made to reference to FIG. 3. FIG. 3 illustrates a flowchart of an example method 300 for dynamic uplink transmission power sharing according to some embodiments of the present disclosure. For the purpose of discussion, the method 300 will be described with reference to FIGS. 1, 2, 4 and 5. The method 300 may involve the UE 120 and panels 105-1, 105-2, shown in FIG. 1.

At block 310, the UE 120 determines whether a total transmission power of a plurality of uplink transmissions to be performed by the UE comprising a plurality of panels exceeds a maximum transmission power of the UE, the plurality of uplink transmissions overlapped in time. The plurality of panels may comprise the panel 105-1 and panel 105-2 as shown in FIG. 1.

Figure 4:
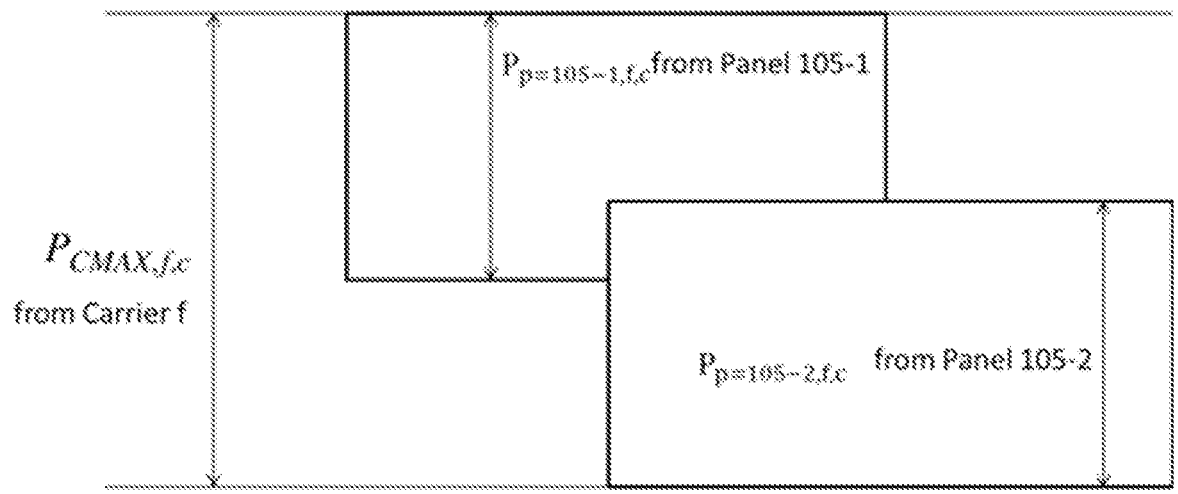
FIG. 4 illustrates a schematic diagram 400 of transmission power on different panels exceeding the total transmission power according to some embodiments of the present disclosure.

If at block 310, the total uplink transmission power of the UE 120 is determined as exceeding the maximum transmission power of the carrier of UE 120, the method 300 proceeds to block 320. As an example, FIG. 4 illustrates a schematic diagram 400 of transmission power on different panels exceeding the total transmission power according to some embodiments of the present disclosure. As shown in FIG. 4, the uplink transmission power on panel 105-1 is $P_{p=105-1,f,c}$, the uplink transmission on panel 105-2 is $P_{p=105-2,f,c}$. The total uplink transmission power exceeds the total uplink transmission power from carrier f of the UE 120, i.e., $P_{p=105-1,f,c}+P_{p=105-2,f,c}>P_{cmax,f,c}$, as illustrated in FIG. 4.

At block 320, the UE 120 determines at least one target uplink transmission from the plurality of uplink transmission to reduce the transmission power in accordance with a determination that the total uplink transmission power exceeds the maximum uplink transmission power.

At block 330, the UE 120 reduce a transmission power of the at least one target uplink transmission to be performed on the at least one panel.

In some embodiments, the UE 120 may determine an uplink transmission having the lowest priority among the plurality of transmissions as the target uplink transmission. The UE 120 may determine the target uplink transmission based on a priority order of the plurality of uplink transmissions. The priority of each uplink transmission may be determined based on the characteristics of the transmission.

In some embodiments, the UE 120 may determine the priorities of the uplink transmissions based on channel types of the plurality of uplink transmissions. The types of the plurality of uplink transmissions may comprise Physical Uplink Shared Channel (PUSCH), Physical Random Access Channel (PRACH), Sounding Reference Signal (SRS), Physical Uplink Control Channel (PUCCH) and the like. Alternatively or in addition, the UE 120 may determine the priorities based on the information carried by the plurality of uplink transmissions. The carried information may comprise Scheduling Request (SR), Hybrid Automatic Repeat Request Acknowledgement (HARQ-ACK) and (Channel State Information) CSI. Alternatively or in addition, the UE 120 may determine the priorities based on the periodicities of the plurality of uplink transmissions, or in other words, time domain behaviors of the plurality of uplink transmissions. Example transmissions with the periodicities may comprise an aperiodic transmission, a semi-persistent transmission and a periodic transmission.

The order of priority of the plurality of transmissions may be hardcode. And two or more of the above characteristics of the uplink transmissions may be combined. For example, the following order may be used to prioritize the overlapping transmissions across panels (in descending order).

PRACH;
PUCCH/PUSCH with HARQ-ACK information and/or SR;
PUCCH/PUSCH with other UCIs;
SRS Transmission with aperiodic SRS having higher priority than semi-persistent and/or persistent SRS.

In some embodiments, if the overlapping transmissions across panels have same priority level, UE 120 may determine a panel having the lowest priority among the plurality of panels as the target panel for reducing uplink transmission power.

In some embodiments, the order of priority of the plurality of panels may be configured by high layer signaling, i.e., Radio Resource Control (RRC).

In some embodiments, the panel with earlier transmission may have higher priority. So the transmission power may be kept constant for a given channel. As illustrated in FIG. 4, the transmission of panel 105-1 starts earlier than the transmission of panel 105-2, so the panel 105-1 may have higher priority and the panel 105-2 may have lower priority. The panel 105-2 may be the target panel for uplink transmission power reduction.

In some embodiments, the UE 120 may determine the priorities based on the serving cells of the plurality of uplink transmissions. If the plurality of panels is used for communication with inter-cell multiple transmit receive point (mTRP) with different Physical Cell Index (PCIs), the panel associated with serving cell may have higher priority.

In some embodiments, after the UE 120 determines an uplink transmission having the lowest priority, the UE 120 may reduce the transmission power of this uplink transmission.

In some embodiments, the value of reduced uplink transmission power may be determined by the UE 120. So after the uplink transmission power reduction performed by UE 120, the left uplink transmission power may not exceed the total uplink transmission power $P_{CMAX,f,c}$.

In some embodiments, a target value of reduced uplink transmission power $X_s$ may be provided by RRC signaling. If the possible reduced uplink transmission power on the target transmission is equal or more than the target value, the UE 120 may perform the transmission. If the possible reduced uplink transmission power on the target transmission is less than the target value, the target transmission may be dropped by the UE 120.

In some embodiments, a common value of $X_s$ may be configured for UE 120, and the common value of $X_s$ is for all uplink channels on the UE 120. Alternatively, or in addition, since different uplink channels may have various functionalities and structure, different value of $X_s$ may be configured for different uplink channels on UE 120. For example, SRS signals are mainly configured for uplink channel measurement and are less sensitive for power reduction. Therefore, a large value of $X_s$ may be configured for SRS to maximize the transmission probability.

Upon determining the target uplink transmission by above prioritization order, the UE 120 may need to determine over which transmission occasion(s) to apply the prioritization order and perform power reduction on the target uplink transmission.

Figure 5:
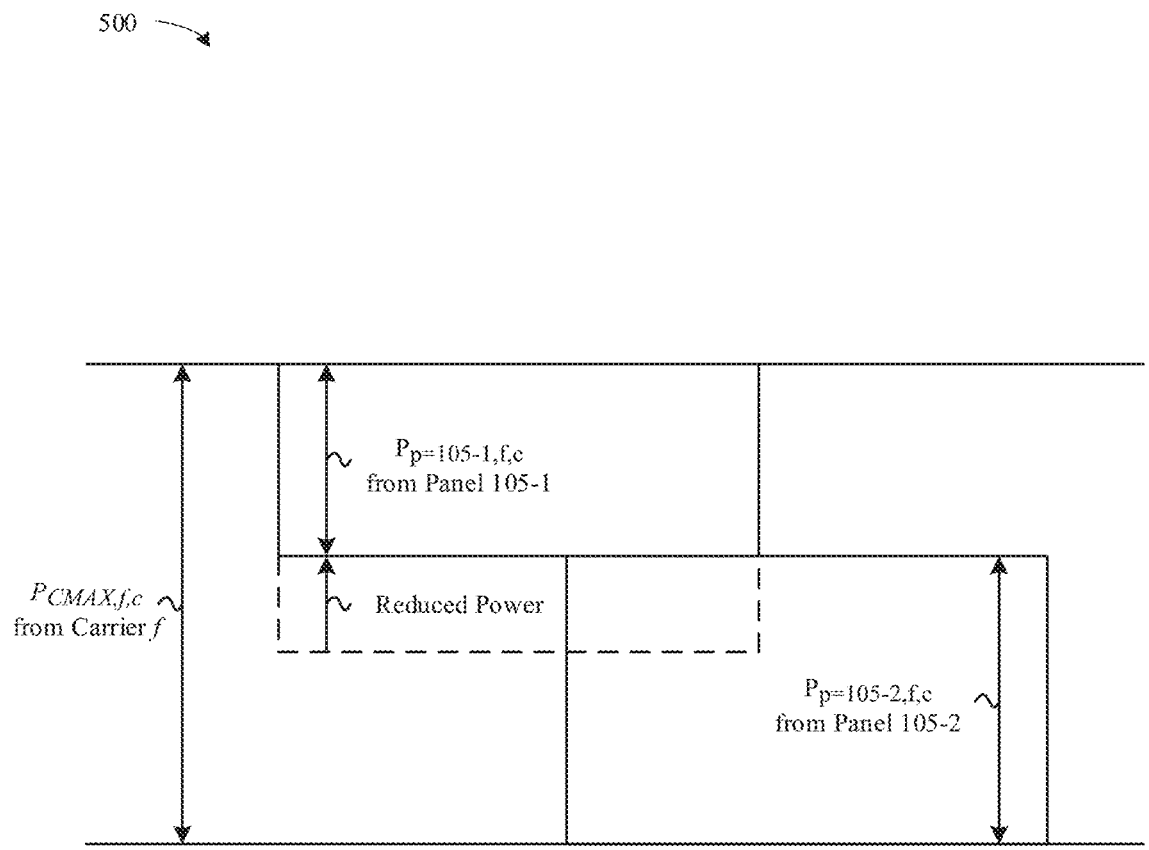
FIG. 5 illustrates a schematic diagram 500 of per-channel basis power control according to some embodiments of the present disclosure.

In some embodiments, the UE 120 may apply the prioritization order and reduce the transmission power on a per-channel basis. FIG. 5 illustrates a schematic diagram 500 of per-channel basis power control according to some embodiments of the present disclosure. As shown in FIG. 5, in the scenario that the total uplink transmission power exceeds the total uplink transmission power from carrier f of the UE 120, i.e., $P_{p=105-1,f,c}+P_{p=105-2,f,c}>P_{cmax,f,c}$, and the uplink transmission on panel 105-2 has higher priority over that of panel 105-1, the entire transmission power of uplink channel on panel 105-1 is reduced, regardless of a symbol is overlapped with symbols of uplink transmission on panel 105-2 or not. As a result, for PUSCH with Uplink Control Information (UCI) transmission, above option may have better decoding performance.

Figure 6:
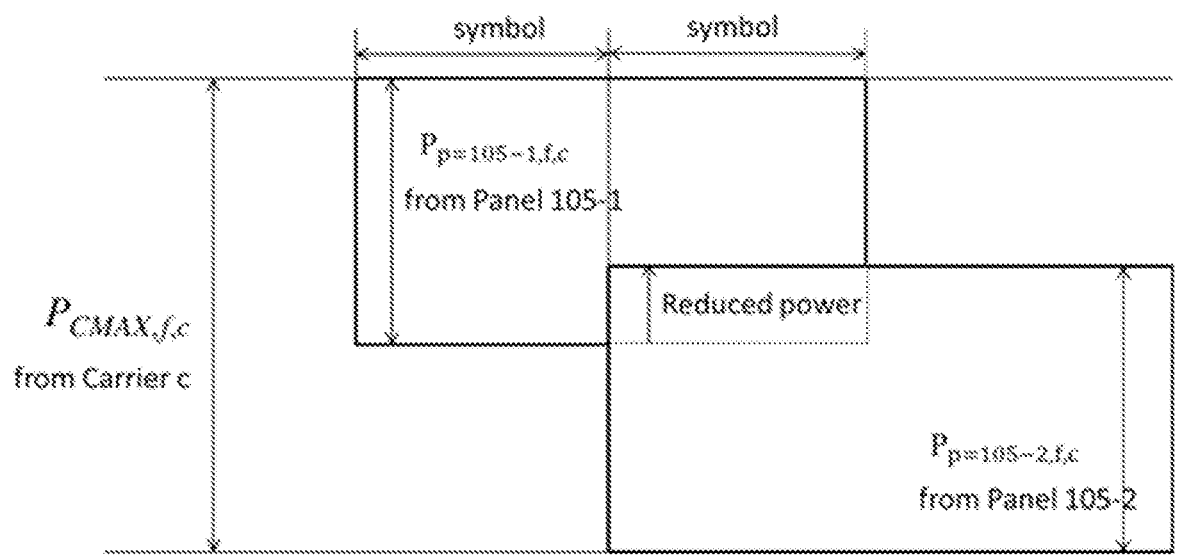
FIG. 6 illustrates a schematic diagram 600 of per-symbol basis power control according to some embodiments of the present disclosure.

In some embodiments, the UE 120 may apply the prioritization order and reduce the transmission power on a per-symbol basis. FIG. 6 illustrates a schematic diagram 600 of per-symbol basis power control according to some embodiments of the present disclosure. As shown in FIG. 6, in the scenario that the total uplink transmission power exceeds the total uplink transmission power from carrier f of the UE 120, i.e., $P_{p=105-1,f,c}+P_{p=105-2,f,c}>P_{cmax,f,c}$, and the uplink transmission on the panel 105-2 has higher priority over that of the panel 105-1, the symbol of the panel 105-1 is overlapped with symbol of the panel 105-2. So only the transmission power on the overlapping symbol of uplink transmission on panel 105-1 is reduced, while the transmission power on non-overlapped symbols are kept without power reduction. As a result, for SRS and PUSCH with UCI transmission, the above option may be more feasible as the UCI is transmitted in the first a set of PUSCH symbols and power scaling may degrade the UCI performance.

Dynamic Uplink Transmission Power Sharing with Reserved Power

A second solution for power control for multi-panel transmission is to reserve a minimum uplink transmission power for the respective panels independently and sharing the remaining uplink transmission power between the plurality of panels. The remaining uplink transmission power is determined by the total uplink transmission power on the carrier and the minimum uplink transmission power for the respective panels. In the second solution, power control is performed across the plurality panels 105 of the UE 120. In this solution, firstly, a minimum uplink transmission power is reserved for the respective panels independently. The reserved power may be for the UCI over PUCCH or Ultra Reliable & Low Latency Communication (URLLC) small packet.

Then the UE 120 performs power control for at least one of the overlapped uplink transmissions from the plurality of panels 105 if a total transmission power of the UE 120 is above a maximum transmission power of the UE 120. In other words, the UE 120 determines whether a total transmission power of the plurality of uplink transmissions to be performed by the UE 120 exceeds the maximum transmission power of the UE 120. The plurality of uplink transmissions are overlapped in time. The UE 120 further reduces the remaining transmission power of the plurality of panels 105 to reduce the total transmission power if the total transmission power exceeds the maximum transmission power. And the reserved uplink transmission power will not be reduced.

In this way, the UE 120 may ensure that the UCI over PUCCH or URLLC small packet can be always transmitted by the UE 120 on the deprioritized Panel toward the other transmit receive point TRP. As a result, the spatial diversity gain can be obtained, and meanwhile, the total transmission power of overlapped uplink transmissions can be lower than the maximum transmission power of the UE 120.

Figure 7:
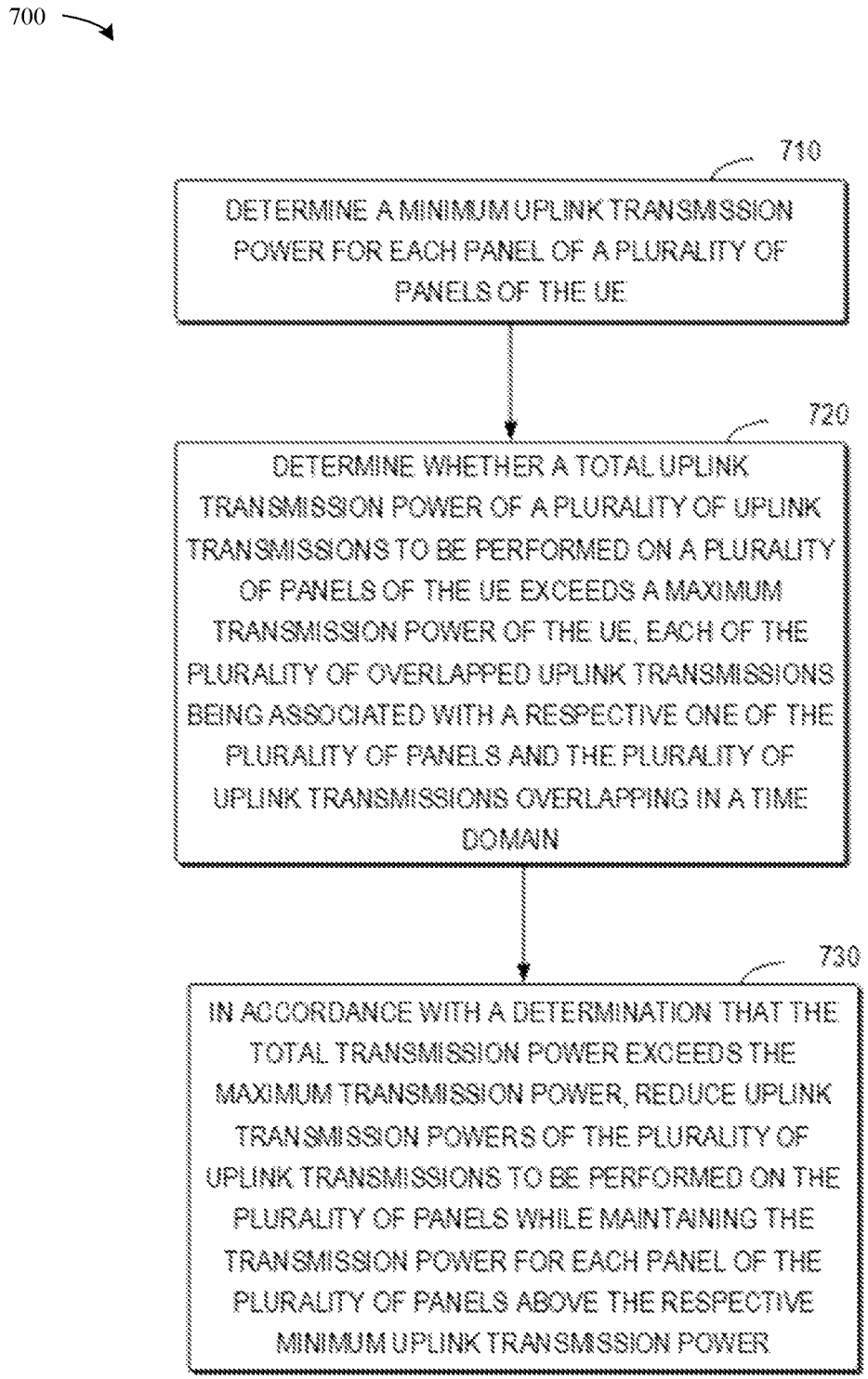
FIG. 7 illustrates a flowchart of an example method 700 for dynamic uplink transmission power sharing with reserved power according to some embodiments of the present disclosure.

Reference is now made to reference to FIG. 7. FIG. 7 illustrates a flowchart of an example method 700 for dynamic uplink transmission power sharing with reserved power according to some embodiments of the present disclosure. For the purpose of discussion, the method 700 will be described with reference to FIGS. 1 and 8. The method 700 may involve the UE 120 and panel 105-1, 105-2, shown in FIG. 1.

Figure 8:
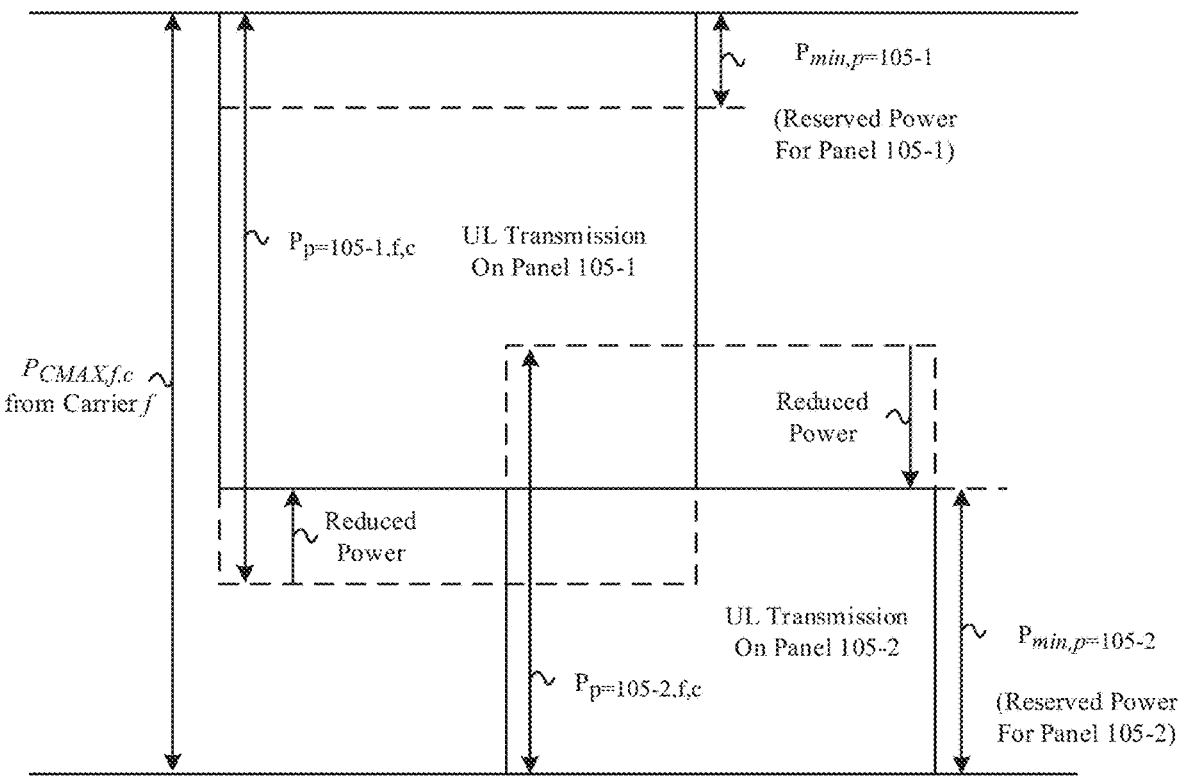
FIG. 8 illustrates a schematic diagram 800 of dynamic uplink transmission power sharing with reserved power according to some embodiments of the present disclosure.

At block 710, the UE 120 reserves a minimum uplink transmission power for a plurality of panels. For example, FIG. 8 illustrates a schematic diagram 800 of dynamic uplink transmission power sharing with reserved power according to some embodiments of the present disclosure. Reference is now made to FIG. 8. As shown in FIG. 8, UE 120 includes two panels, the panel 105-1 and panel 105-2. The reserved uplink transmission power $P_{min,p=105-1}$ is for Panel 105-1, and the reserved uplink transmission power $P_{min,p=105-2}$ is for Panel 105-2. The reserved power may be for the UCI over PUCCH or URLLC small packet. By this solution, the UCI over PUCCH or URLLC small packet can be always transmitted by the UE 120 on the deprioritized Panel toward the other TRP. As a result, the spatial diversity gain can be obtained.

In some embodiments, the reserved power can be configured for the respective uplink panel independently by scaling factor. For example, the scaling factor $\alpha_{105-1}$ is for the panel 105-1 and the scaling factor $\alpha_{105-2}$ is for the panel 105-2. The scaling factor $\alpha_{105-1}$ and $\alpha_{105-2}$ may be the percentage of the total uplink transmission power on carrier f. So the reserved power for the respective panel can be represented as, $P_{min,p}=P_{cmax,f,c}*\alpha_p$, P=0,1. In some embodiments, the scaling factor for the respective uplink panel may be configured by high layer signaling.

At block 720, the UE determining whether a total transmission power of a plurality of uplink transmissions to be performed by the UE comprising a plurality of panels exceeds a maximum transmission power of the UE, the plurality of uplink transmissions overlapped in time.

If at block 720, the total uplink transmission power of the UE 120 is determined as exceeding the maximum transmission power of the carrier of UE 120, the method 700 proceeds to block 730. As shown in FIG. 8, the uplink transmission power on panel 105-1 is $P_{p=105-1,f,c}$, the uplink transmission on panel 105-2 is $P_{p=105-2,f,c}$. The total uplink transmission power exceeds the total uplink transmission power from carrier f of the UE 120, i.e., $P_{p=105-1,f,c}+P_{p=105-2,f,c}>P_{cmax,f,c}$, as illustrated in FIG. 8.

At block 730, the UE 120 reduces uplink transmission powers of the plurality of uplink transmissions to be performed on the plurality of panels while maintaining the transmission power for each panel of the plurality of panels above the respective minimum uplink transmission power in accordance with a determination that the total uplink transmission power exceeds the maximum uplink transmission power. Since the minimum uplink transmission power is reserved at block 710, the UE 120 may just scaling/dropping the remaining uplink transmission power.

In some embodiments, the UE 120 may determine the uplink transmissions to be performed by the remaining transmission power. And among these uplink transmissions, the uplink transmission having the lowest priority can be determined as the target uplink transmission. The UE 120 may determine the target uplink transmission based on a priority order of the plurality of uplink transmissions. The priority of each uplink transmission may be determined based on the characteristics of the transmission.

In some embodiments, the UE 120 may determine the priorities of the uplink transmissions based on channel types of the plurality of uplink transmissions. The types of the plurality of uplink transmissions may comprise PUSCH, PRACH, SRS, PUCCH and the like. Alternatively or in addition, the UE 120 may determine the priorities based on the information carried by the plurality of uplink transmissions. The carried information may comprise SR, HARQ-ACK and CSI. Alternatively or in addition, the UE 120 may determine the priorities based on the periodicities of the plurality of uplink transmissions, or in other words, time domain behaviors of the plurality of uplink transmissions. Example transmissions with the periodicities may comprise an aperiodic transmission, a semi-persistent transmission and a periodic transmission.

The order of priority of the plurality of transmissions may be hardcode. And two or more of the above characteristics of the uplink transmissions may be combined. For example, the following order may be used to prioritize the overlapping transmissions across panels (in descending order).

PRACH;
PUCCH/PUSCH with HARQ-ACK information and/or SR;
PUCCH/PUSCH with other UCIs;
SRS Transmission with aperiodic SRS having higher priority than semi-persistent and/or persistent SRS.

In some embodiments, if the overlapping transmissions across panels have same priority level, UE 120 may determine a panel having the lowest priority among the plurality of panels as the target panel for reducing uplink transmission power.

In some embodiments, the order of priority of the plurality of panels may be configured by high layer signaling, i.e., RRC.

In some embodiments, the panel with earlier transmission may have higher priority. So the transmission power may be kept constant for a given channel. As illustrated in FIG. 8, the transmission of panel 105-1 starts earlier than the transmission of panel 105-2, so the panel 105-1 may have higher priority and the panel 105-2 may have lower priority. The panel 105-2 may be the target panel for uplink transmission power reduction.

In some embodiments, the UE 120 may determine the priorities based on the serving cells of the plurality of uplink transmissions. If the plurality of panels is used for communication with inter-cell mTRP with different PCIs, the panel associated with serving cell may have higher priority.

In some embodiments, after the UE 120 determines an uplink transmission having the lowest priority, the UE 120 may reduce the transmission power of this uplink transmission.

In some embodiments, the value of reduced uplink transmission power may be determined by the UE 120. So after the uplink transmission power reduction performed by UE 120, the left uplink transmission power may not exceed the total uplink transmission power $P_{CMAX,f,c}$.

In some embodiments, a target value of reduced uplink transmission power $X_s$ may be provided by RRC signaling. If the possible reduced uplink transmission power on the target transmission is equal or more than the target value, the UE 120 may perform the transmission. If the possible reduced uplink transmission power on the target transmission is less than the target value, the target transmission may be dropped by the UE 120.

In some embodiments, a common value of $X_s$ may be configured for UE 120, and the common value of $X_s$ is for all uplink channels on the UE 120. Alternatively, or in addition, since different uplink channels may have various functionalities and structure, different value of $X_s$ may be configured for different uplink channels on UE 120. For example, SRS signals are mainly configured for uplink channel measurement and are less sensitive for power reduction. Therefore, a large value of $X_s$ may be configured for SRS to maximize the transmission probability.

Upon determining the target uplink transmission by above prioritization order, the UE 120 may need to determine over which transmission occasion(s) to apply the prioritization order and perform power reduction on the target uplink transmission.

In some embodiments, the UE 120 may apply the prioritization order and reduce the transmission power on a per-channel basis.

In some embodiments, the UE 120 may apply the prioritization order and reduce the transmission power on a per-symbol basis.

Semi-Static Uplink Transmission Power Sharing

A third solution for power control for multi-panel transmission is to maintain a maximum transmission power for each panel. In the third solution, power control is performed per panel. For example, the UE 120 may ensure that the maximum transmission power of each panel is lower than the maximum transmission power of the UE 120. In some embodiments, the UE 120 may ensure that a sum of the maximum transmission powers of all panels 105 is lower than the maximum transmission power of the UE 120.

In this solution, the UE 120 performs power control for a panel when a total transmission power from this panel is above its maximum transmission power. In other words, the UE 120 determines whether a total transmission power of a plurality of uplink transmissions to be performed from a given panel of the UE exceeds a maximum transmission power of the given panel. The plurality of uplink transmissions are overlapped in time. The UE 120 reduces a transmission power of a first uplink transmission of the plurality of uplink transmissions to reduce the total transmission power if the total transmission power exceeds the maximum transmission power. The first uplink transmission has a lower priority than a second uplink transmission of the plurality of uplink transmissions. In this way, the UE 120 may ensure that the total transmission power in each panel is lower than the respective maximum transmission power.

Figure 9:
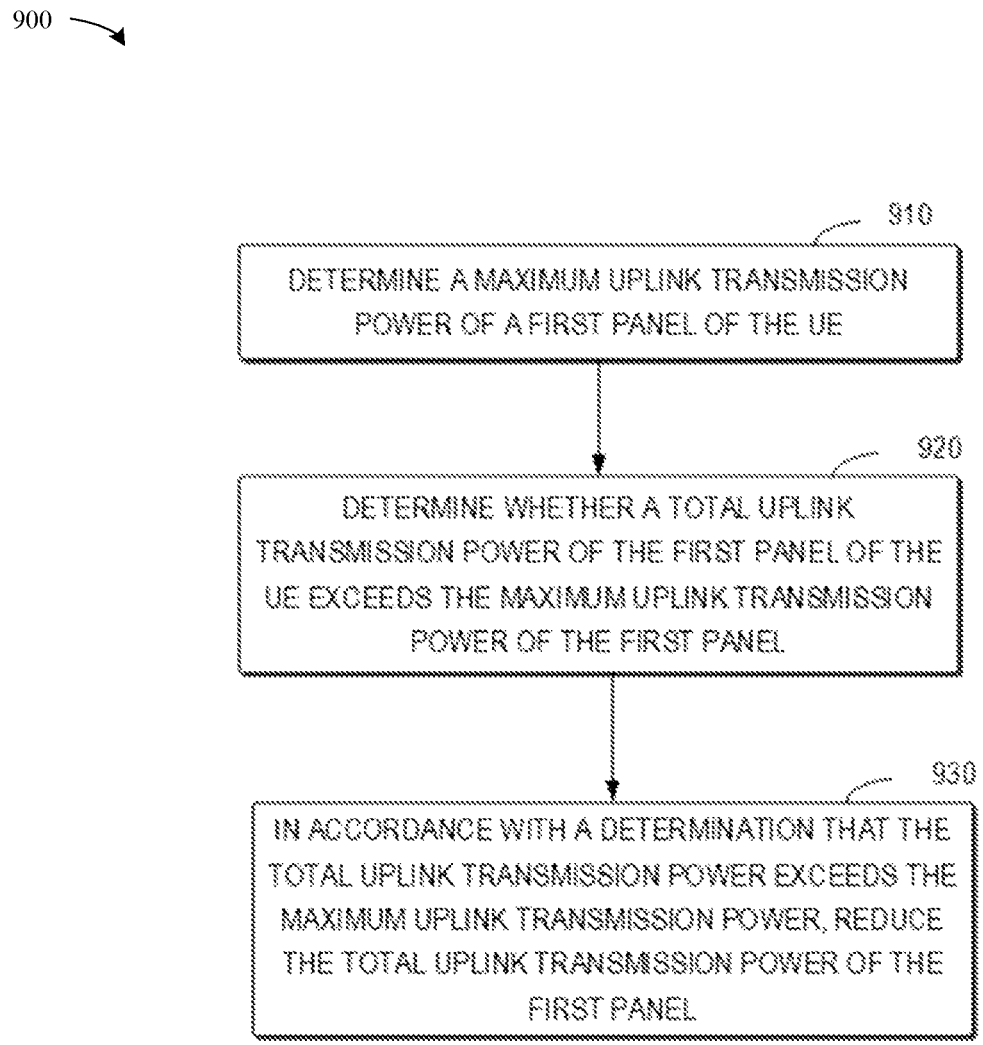
FIG. 9 illustrates a flowchart illustrating an example method 900 of semi-static power sharing according to some embodiments of the present disclosure.

Reference is now made to reference to FIG. 9. FIG. 9 illustrates a flowchart illustrating an example method 900 of semi-static power sharing according to some embodiments of the present disclosure. For the purpose of discussion, the method 900 will be described with reference to FIGS. 1 and 5. The method 900 may involve the UE 120, the panel 105-1, 105-2, shown in FIG. 1. It is to be understood that the method 900 may include additional blocks not shown and/or may omit some shown blocks, and the scope of the present disclosure is not limited in this regard.

At block 910, the UE 120 determines a maximum uplink transmission power of a first panel of the UE.

Figure 10:
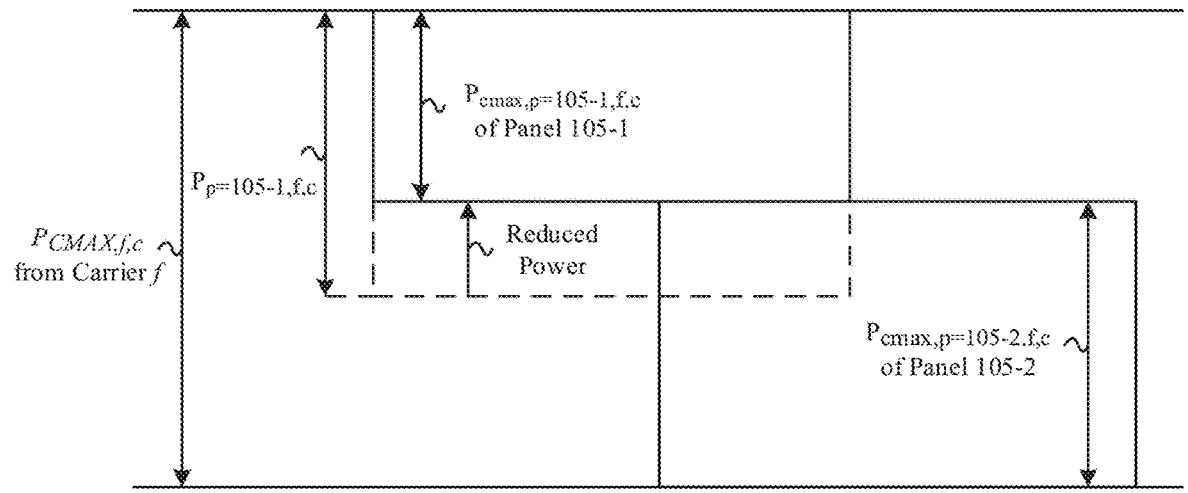
FIG. 10 illustrates a schematic diagram 1000 of semi-static power sharing according to some embodiments of the present disclosure.

For example, FIG. 10 illustrates a schematic diagram 1000 of semi-static power sharing according to some embodiments of the present disclosure. As shown in FIG. 10, the maximum output power $P_{cmax,p,f,c}$ is for a uplink panel p of a carrier f, wherein $P_{cmax,p=105-1,f,c}$ is max output power for the panel 105-1, and $P_{cmax,p=105-2,f,c}$ is max output power for the panel 105-2.

In some embodiments, the values of maximum output power may be explicitly configured by RRC signaling. For example, the $P_{cmax,p=105-1,f,c}$ and $P_{cmax,p=105-2,f,c}$ may be explicitly configured for UE 120 by RRC signaling.

In some embodiments, the scaling factors may be explicitly configured for the panels. For example, two scaling factors $\gamma_{p=105-1}, \gamma_{p=105-2}$ may be explicitly configured for the panel 105-1 and panel 105-2. So the UE 120 may determine the $P_{cmax,p,f,c}$ as follows:

$$P_{cmax,p=105-1,f,c} = \gamma_{p=105-1} * P_{cmax,f,c};$$

$$P_{cmax,p=105-2,f,c} = \gamma_{p=105-2} * P_{cmax,f,c}.$$

As an example, Table 1 provides 16 exemplified candidate values for parameter $\gamma_{p=105-1}$, $\gamma_{105-2}$ with 4-bit indication.

TABLE 1

$\gamma_{p=105-1}$ OR $\gamma_{p=105-2}$ values for determining power allocation for each panel.

| RRC configuration index | $\gamma_{p=105-1}(\gamma_{p=105-2})$ value in % |
|---|---|
| 0 | 0 |
| 1 | 5 |
| 2 | 10 |
| 3 | 15 |
| 4 | 20 |
| 5 | 30 |
| 6 | 37 |
| 7 | 44 |
| 8 | 50 |
| 9 | 56 |
| 10 | 63 |
| 11 | 70 |
| 12 | 80 |
| 13 | 90 |
| 14 | 95 |
| 15 | 100 |

In some embodiments, the $\gamma_{p=105-1}=1-\gamma_{p=105-2}$, which can minimize the signaling overhead.

At block 920, the UE 120 determines whether a total uplink transmission power of the first panel of the UE exceeds the maximum uplink transmission power of the first panel.

If at block 920, the total uplink transmission power of the first panel of the UE 120 is determined as exceeding the maximum transmission power of the first panel, the method 900 proceeds to block 930. As shown in FIG. 10, the uplink transmission power on panel 105-1 is $P_{p=105-1,f,c}$. The uplink transmission power $P_{p=105-1,f,c}$ exceeds the maximum uplink transmission power of the first panel, $P_{cmax,p=105-1,f,c}$, as illustrated in FIG. 10.

At block 930, the UE 120 reduces the total uplink transmission power of the first panel in accordance with a determination that the total uplink transmission power exceeds the maximum uplink transmission power. So that the total power in every symbol is smaller than or equal to the maximum uplink transmission power, that is, $P_{cmax,p,f,c}$.

In some embodiments, the semi-static power sharing may be defined as mandatory features for UE supporting STxMP Mode-1 and STxMP Mode-2.

Figure 11:
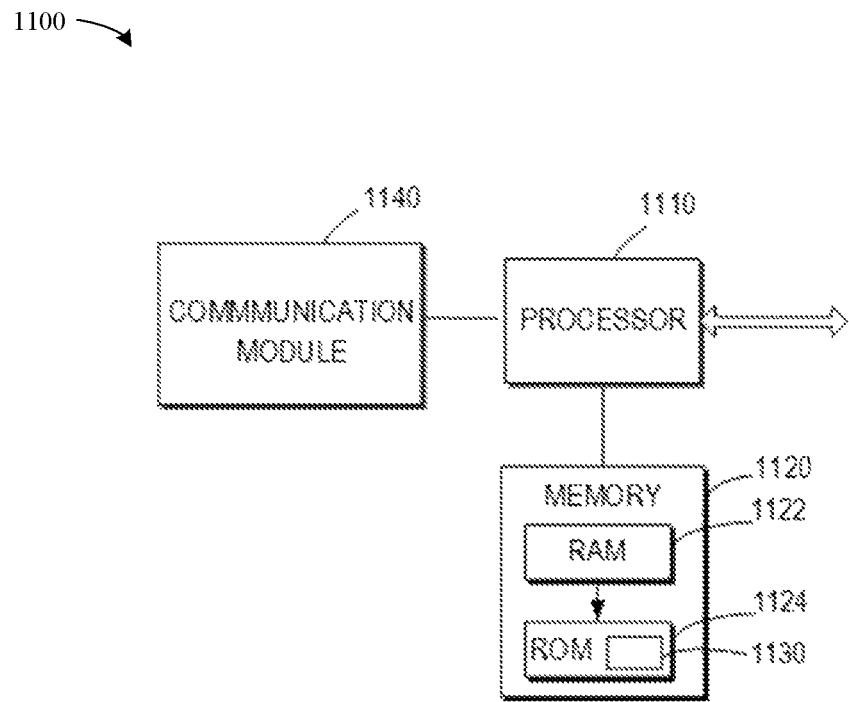
FIG. 11 illustrates a simplified block diagram of a device that is suitable for implementing embodiments of the present disclosure.

FIG. 11 is a simplified block diagram of a device 1100 that is suitable for implementing embodiments of the present disclosure. For example, the BS 110 and the UE 120 can be implemented by the device 1100. As shown, the device 1100 includes a processor 1110, a memory 1120 coupled to the processor 1110, and a transceiver 1140 coupled to the processor 1110.

The transceiver 1140 is for bidirectional communications. The transceiver 1140 is coupled to at least one antenna to facilitate communication. The transceiver 1140 can comprise a transmitter circuitry (e.g., associated with one or more transmit chains) and/or a receiver circuitry (e.g., associated with one or more receive chains). The transmitter circuitry and receiver circuitry can employ common circuit elements, distinct circuit elements, or a combination thereof.

The processor 1110 may be of any type suitable to the local technical network and may include one or more of the following: general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The memory 1120 may include one or more non-volatile memories and one or more volatile memories. Examples of the non-volatile memories include, but are not limited to, a Read Only Memory (ROM) 1124, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1122 and other volatile memories that will not last in the power-down duration.

A computer program 1130 includes computer executable instructions that are executed by the associated processor 1110. The program 1130 may be stored in the ROM 1124. The processor 1110 may perform any suitable actions and processing by loading the program 1130 into the RAM 1122.

The embodiments of the present disclosure may be implemented by means of the program 1130 so that the device 1100 may perform any process of the disclosure as discussed with reference to FIGS. 3-10. The embodiments of the present disclosure may also be implemented by hardware or by a combination of software and hardware.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 as described above with reference to FIG. 3 and/or the method 700 as described above with reference to FIG. 7 and/or the method 900 as described above with reference to FIG. 9.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A processor of a user equipment (UE) configured to:
determine whether a total transmission power of a plurality of overlapped uplink transmissions to be performed on a plurality of panels of the UE exceeds a maximum transmission power of the UE, each of the plurality of overlapped uplink transmissions being associated with a respective one of the plurality of panels;
determine priorities of the plurality of overlapped uplink transmissions to be performed on the plurality of panels; and
in accordance with a determination that the total transmission power exceeds the maximum transmission power and the priorities of the plurality of overlapped uplink transmissions across the plurality of panels are the same:
  determine at least one target panel that has a lowest priority among the plurality of panels;
  determine at least one target uplink transmission from the plurality of overlapped uplink transmissions and associated with the at least one target panel; and
  reduce a transmission power of the at least one target uplink transmission to be performed on the associated at least one panel.

2. The processor of claim 1, wherein the priorities of the plurality of overlapped uplink transmissions are based on at least one of:
  channel types of the plurality of overlapped uplink transmissions,
  information carried by the plurality of overlapped uplink transmissions,
  traffic types of the plurality of overlapped uplink transmissions, or
  periodicities of the plurality of overlapped uplink transmissions.

3. The processor of claim 1, wherein the processor is further configured to:
  determine the at least one target panel that has the lowest priority among the plurality of panels by Radio Resource Control (RRC) signaling.

4. The processor of claim 1, wherein the priorities of the plurality of panels are based on at least one of:
  a start time of the plurality of overlapped uplink transmissions performed on the plurality of panels, or
  a cell type of the plurality of overlapped uplink transmissions performed on the plurality of panels.

5. The processor of claim 1, wherein the processor is further configured to: determine, by the UE, a value by which the transmission power is to be reduced.

6. The processor of claim 1, wherein the processor is further configured to: receive, by RRC signaling, a value by which the transmission power is to be reduced.

7. The processor of claim 6, wherein the plurality of overlapped uplink transmissions on any channel of the UE have a same value by which the transmission power is to be reduced.

8. The processor of claim 6, wherein the plurality of overlapped uplink transmissions on different channels of the UE have different values by which the transmission power is to be reduced.

9. The processor of claim 1, wherein the processor is further configured to: reduce the transmission power on a per-channel basis.

10. The processor of claim 1, wherein the processor is further configured to: reduce the transmission power on a per-symbol basis.

11. A processor of a user equipment (UE) configured to:
  determine a minimum uplink transmission power for each panel of a plurality of panels of the UE;
  determine whether a total uplink transmission power of a plurality of uplink transmissions to be performed on a plurality of panels of the UE exceeds a maximum transmission power of the UE, each of the plurality of uplink transmissions being associated with a respective one of the plurality of panels and the plurality of uplink transmissions overlapping in a time domain;
  determine priorities of the plurality of overlapped uplink transmissions to be performed on the plurality of panels; and
  in accordance with a determination that the total uplink transmission power exceeds the maximum transmission power and the priorities of the plurality of overlapped uplink transmissions across the plurality of panels are the same:
    determine at least one target panel that has a lowest priority among the plurality of panels; and
    reduce uplink transmission powers of the plurality of uplink transmissions to be performed on the plurality of panels including the at least one target panel while maintaining a transmission power for each panel of the plurality of panels above the respective minimum uplink transmission power.

12. The processor of claim 11, wherein the minimum uplink transmission power is determined by a scaling factor.

13. The processor of claim 12, wherein the minimum uplink transmission power of each panel is determined by Radio Resource Control (RRC) signaling.

14. The processor of claim 11, wherein the priorities of the plurality of uplink transmissions are based on at least one of:
  channel types of the plurality of uplink transmissions,
  information carried by the plurality of uplink transmissions,
  traffic types of the plurality of uplink transmissions, or
  periodicities of the plurality of uplink transmissions.

15. The processor of claim 11, wherein the at least one target panel that has the lowest priority among the plurality of panels are determined by Radio Resource Control (RRC) signaling.

16. The processor of claim 11, wherein the priorities of the plurality of panels are based on at least one of:
  a starting time of the plurality of uplink transmissions performed on the plurality of panels, or
  a cell type of the plurality of uplink transmissions performed on the plurality of panels.

17. The processor of claim 11, wherein the processor is further configured to:
  determine, by the UE, a value by which the transmission power is to be reduced.

18. The processor of claim 11, wherein the processor is further configured to:
  receive, by RRC signaling, a value by which the transmission power is to be reduced.

19. The processor of claim 18, wherein the plurality of uplink transmissions on any channel of the UE have the same value by which the transmission power is to be reduced.

20. The processor of claim 18, wherein the plurality of uplink transmissions on different channels of the UE have different values by which the transmission power is to be reduced.

21. The processor of claim 11, wherein the transmission power is reduced on a per-channel or per-symbol basis.

22. A method performed by a processor of a user equipment (UE), the method comprising:
  determining whether a total transmission power of a plurality of overlapped uplink transmissions to be performed on a plurality of panels of the UE exceeds a maximum transmission power of the UE, each of the plurality of overlapped uplink transmissions being associated with a respective one of the plurality of panels;

determining priorities of the plurality of overlapped uplink transmissions to be performed on the plurality of panels; and in accordance with a determination that the total transmission power exceeds the maximum transmission power and the priorities of the plurality of overlapped uplink transmissions across the plurality of panels are the same:

determining at least one target panel that has a lowest priority among the plurality of panels;

determining at least one target uplink transmission from the plurality of overlapped uplink transmissions and associated with the at least one target panel; and reducing a transmission power of the at least one target uplink transmission to be performed on the associated at least one panel.

23. The method of claim 22, wherein the priorities of the plurality of overlapped uplink transmissions are based on at least one of:

channel types of the plurality of overlapped uplink transmissions, information carried by the plurality of overlapped uplink transmissions, traffic types of the plurality of overlapped uplink transmissions, or periodicities of the plurality of overlapped uplink transmissions.

24. The method of claim 22, further comprising:

determining the at least one target panel that has the lowest priority among the plurality of panels by Radio Resource Control (RRC) signaling.

25. The method of claim 22, wherein the priorities of the plurality of panels are based on at least one of:

a start time of the plurality of overlapped uplink transmissions performed on the plurality of panels, or a cell type of the plurality of overlapped uplink transmissions performed on the plurality of panels.

26. The method of claim 22, further comprising:

determining a value by which the transmission power is to be reduced.

27. The method of claim 22, further comprising:

receive, by RRC signaling, a value by which the transmission power is to be reduced.

28. The method of claim 22, wherein the plurality of overlapped uplink transmissions on any channel of the UE have a same value by which the transmission power is to be reduced.

29. The method of claim 22, wherein the plurality of overlapped uplink transmissions on different channels of the UE have different values by which the transmission power is to be reduced.

* * * * *